March 7, 1933. M. D. MARTIN 1,900,832

FISH LURE

Filed May 7, 1932

Inventor
Marshall D. Martin

By E. W. Bradford

Attorney

Patented Mar. 7, 1933

1,900,832

UNITED STATES PATENT OFFICE

MARSHALL D. MARTIN, OF NEW ORLEANS, LOUISIANA

FISH LURE

Application filed May 7, 1932. Serial No. 609,918.

This invention relates to artificial fishing lures and the object of the invention is to provide a lure which is attractive and which will remain upright on the surface of the water and upon movement due to tipping of the rod or stripping the line will cause a series of bubbles to be emitted thereby creating a disturbance which will attract and cause fish to strike the lure, all as will be hereinafter more fully described and claimed.

Figure 1:
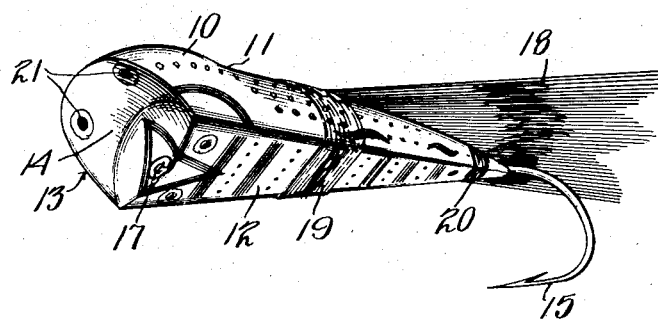
Figure 2:
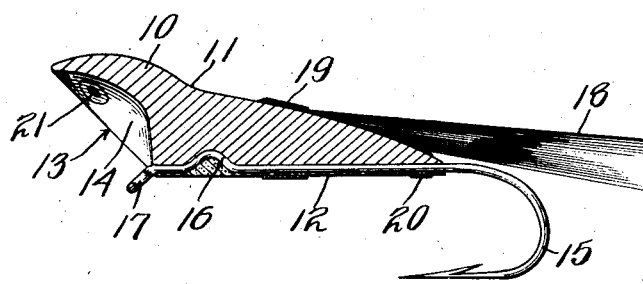
Figure 3:
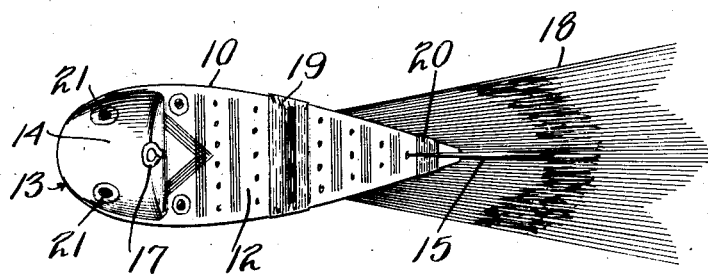

Referring to the accompanying drawing, which is made a part hereof and on which similar reference characters indicate similar parts, Figure 1 is a perspective view of the complete lure, Figure 2, a section view in elevation of the lure, and Figure 3, a plan view of the bottom of the lure.

In the drawing reference character 10 indicates the body portion of the lure formed of any suitable material, but preferably made of balsa wood which is very light and will cause less strain on a rod than when other kinds of wood are used. The body portion tapers from the head to the tail of the lure and is so designed and shaped as to reduce resistance both in casting and retrieving the lure from the water. The taper and curve of the surface of the back portion is more decided at a point 11 which is slightly back of the forward end. The bottom surface 12 is flat which allows the lure to float in an upright position without the use of extra weights to balance it. The forward end 13 of the body portion is cut upwardly and forwardly forming a sloping head end which is further dished inwardly forming substantially a concaved face 14. The angle of the head end is shown to be cut on a 45° angle for the purpose of illustration but this, however, does not necessarily limit the structure to this specific form but it may be cut on any desired angle suitable for the purpose.

A hook 15 having a kinked shank portion 16 and an eyelet with a downwardly bent eye 17 is securely embedded in the body portion 10 in such a manner that the eyelet 17 is at the bottom surface 12 and the hook 15 extends outwardly at the tail portion of the lure as clearly shown in Figure 2. The hook is fixed in the body portion in the following manner. The bottom of the body is split along the center line and the hook is placed therein. A small quantity of cement or glue is applied and the sides of the body are compressed together firmly securing the hook in place.

The body 10 of the lure is provided with a hook guard 18 formed of flexible bristles. The guard is secured in place by means of the thread 19 wound over the inner ends of the bristles and around the body portion. Feathers, hairs or any other material may be used in place of the bristles and may be of different colors which makes the lure very attractive to fish. An additional winding 20 of thread may be wound around the lure at the tail end, which along with the thread 19 tends to make the hook more secure.

Eyes 21 of any suitable character may be secured to the concaved face 14, or if desirable the eyes may be painted thereon.

It should also be noted that the body of the lure, particularly the flat bottom surface 12, may be painted or decorated by using various designs and color schemes as desired. Metallic silver may be used to make the lure more attractive, particularly on dark and cloudy days. After the lure has been colored and the desired material attached to it, the entire lure may be coated with lacquer to assist in retaining the color and prolong the life of the paint.

The operation or use of the lure is very simple. When the lure is cast upon the water, the slightest tipping of the rod or stripping of the line will cause a series of bubbles to be emitted due to the concaved head 14, the position of the eyelet 17 and the angle to which the head is cut. This is quite similar to the action of a fish when striking for food at the surface of the water and which will naturally be very attractive to fish.

By using a wood which is several times lighter than cork and so constructed in shape that it is extremely buoyant and will float upright when in the water, a lure results which is very desirable for fly rod fishing as well as bait casting.

It will be obvious to those skilled in the art that various changes may be made in my device without departing from the spirit of the invention and therefore I do not limit myself to what is shown in the drawing and described in the specification, but only as indicated by the appended claims.

Having thus fully described my said invention, what I claim as new and desire to secure by Letters Patent, is:

1. An artificial fish lure comprising a tapered body having a flat bottom and a forward end provided with a concaved portion, said concaved portion being formed on the underside of said body, eyes secured to the concaved portion of said end being positioned so as to be seen from the underside of said body, a hook embedded in said body with an eyelet projecting at the forward end and a hook portion at the rear end, the flat bottom of said body providing a wide area on which coloring may be applied, substantially as set forth.

2. A fish lure comprising a tapered body having a flat bottom, the front end of said body sloping inwardly from the top and provided with a concaved portion therein, eyes fixed to said concaved portion, a hook having a kinked shank embedded in said body, the hook portion of said hook projecting at the rear end and the eyelet projecting downwardly at the front end below the flat bottom, said bottom of the lure being highly colored and marked to be attractive to fish when said lure is on the surface of the water, substantially as set forth.

In witness whereof, I have hereunto set my hand at New Orleans, Louisiana, this 28th day of April, A. D. nineteen hundred and thirty-two.

MARSHALL D. MARTIN.